US012608166B2

(12) United States Patent
Vinas

(10) Patent No.: US 12,608,166 B2
(45) Date of Patent: Apr. 21, 2026

(54) AUTOMATED DATA HANDLING

(71) Applicant: T-Mobile Innovations LLC, Overland Park, KS (US)

(72) Inventor: Joel Vinas, Lee's Summit, MO (US)

(73) Assignee: T-Mobile Innovations LLC, Overland Park, KS (US)

( * ) Notice: Subject to any disclaimer, the term of this patent is extended or adjusted under 35 U.S.C. 154(b) by 280 days.

(21) Appl. No.: 18/423,276

(22) Filed: Jan. 25, 2024

(65) Prior Publication Data

US 2025/0244932 A1      Jul. 31, 2025

(51) Int. Cl.
*G06F 3/12* (2006.01)

(52) U.S. Cl.
CPC .......... *G06F 3/1268* (2013.01); *G06F 3/1204* (2013.01); *G06F 3/1273* (2013.01); *G06F 3/1285* (2013.01)

(58) Field of Classification Search
CPC ..... G06F 3/1268; G06F 3/1273; G06F 3/1285
See application file for complete search history.

(56) References Cited

U.S. PATENT DOCUMENTS

| | | | |
|---|---|---|---|
| 9,122,433 B2* | 9/2015 | Haapanen | G06F 3/1203 |
| 2013/0173530 A1* | 7/2013 | Laron | G06F 16/176 |
| | | | 707/608 |

* cited by examiner

*Primary Examiner* — Ibrahim Siddo

(57) ABSTRACT

In some examples, a method includes obtaining, by a file handling application, a file; automatically providing, by the file handling application, a notification of the upload of the file; automatically determining, by the file handling application, a rule set for applying to the file; handling, automatically by the file handling application and without human intervention, the file based on the rule set; interfacing, by the file handling application, with a project management application to automatically update a status of a project associated with the file based on actions taken by the file handling application; responsive to each interaction by the file handling application with the file, automatically logging, in a searchable database by the file handling application, each action taken by the file handling application with respect to the file to create an audit history for the file.

20 Claims, 3 Drawing Sheets

200

OBTAIN A FILE FROM A USER ⟋ 202

PROVIDE A NOTIFICATION OF UPLOAD OF THE FILE ⟋ 204

DETERMINE A RULE SET FOR APPLYING TO THE FILE ⟋ 206

HANDLE THE FILE BASED ON THE RULE SET ⟋ 208

INTERFACE WITH A PROJECT MANAGEMENT APPLICATION TO UPDATE A STATUS OF A PROJECT ASSOCIATED WITH THE FILE ⟋ 210

OBTAIN A SECOND FILE FROM A THIRD PARTY AND PROVIDE THE SECOND FILE TO THE USER ⟋ 212

AUTOMATED DATA HANDLING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In certain circumstances, files may be transferred between parties to facilitate collaboration, shared responsibility, or the division of labor for an overall project or task. As file sizes increase, file quantities increase, or persons involved in the project increase, it can become cumbersome.

SUMMARY

In some examples, a method of performing automatic project management across multiple systems including automated project milestone tracking and automated tagging, routing, notification, and logging of files for print production is provided. The method includes monitoring, automatically by a file handling application, a folder of a data store. The method also includes determining, automatically by the file handling application, that a file has been stored in the folder by a first user, wherein the file is a print-ready file for printing and has a file size greater than a communicable size. The method also includes, responsive to determining that the file has been stored in the folder, automatically moving, by the file handling application, the file from the folder to a second data store having restricted access permissions. The method also includes automatically determining by the file handling application, responsive to obtaining the file and based on a file name of the file and a file type of the file, a rule set to apply to the file, wherein the rule set indicates actions to perform with respect to the file including routing the file between multiple systems automatically and without human intervention. The method also includes providing, automatically by the file handling application and based on the rule set, the file to a second user, wherein the second user is a vendor tasked with printing the file. The method also includes receiving, from the second user, a second file, wherein the second file is a printer proof of the file prepared by the second user. The method also includes automatically determining by the file handling application, responsive to obtaining the second file, a rule set to apply to the second file. The method also includes providing, automatically by the file handling application and based on the rule set, the second file to the first user for approval or rejection of the printer proof by the first user. The method also includes interacting, automatically and without human intervention, with a project management system to, in real-time, update project milestones of a project associated with the file based on obtaining the file, routing the file, obtaining the second file, and providing the second file.

In some examples, a method of performing automatic project management across multiple systems including automated project milestone tracking, automated tagging, routing, notification of file, and logging of files, and automated generation of an audit history is provided. The method includes obtaining, by a file handling application, a file. The method also includes automatically providing, by the file handling application, a notification of the upload of the file. The method also includes automatically determining, by the file handling application, a rule set for applying to the file. The method also includes handling, automatically by the file handling application and without human intervention, the file based on the rule set. The method also includes interfacing, by the file handling application, with a project management application to automatically update a status of a project associated with the file based on actions taken by the file handling application. The method also includes, responsive to each interaction by the file handling application with the file, automatically logging, in a searchable database by the file handling application, each action taken by the file handling application with respect to the file to create an audit history for the file.

In some examples, a system for automatic project management across multiple systems including automated project milestone tracking, automated tagging, routing, notification of file, and logging of files, and automated generation of an audit history is provided. The system includes a data store and a server executing a file management application. The Executing the file management application causes the server to be configured to obtain a file. Executing the file management application also causes the server to be configured to, responsive to obtaining the file, automatically determine a rule set to apply to the file, wherein the rule set indicates actions for the server to perform with respect to the file including routing the file between multiple systems automatically and without human intervention. Executing the file management application also causes the server to be configured to, based on the rule set, automatically provide the file to a user. Executing the file management application also causes the server to be configured to, responsive to each interaction by the file management application with the file, automatically logging, in a searchable database by the file management application, each action taken by the file management application with respect to the file to create an audit history for the file.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
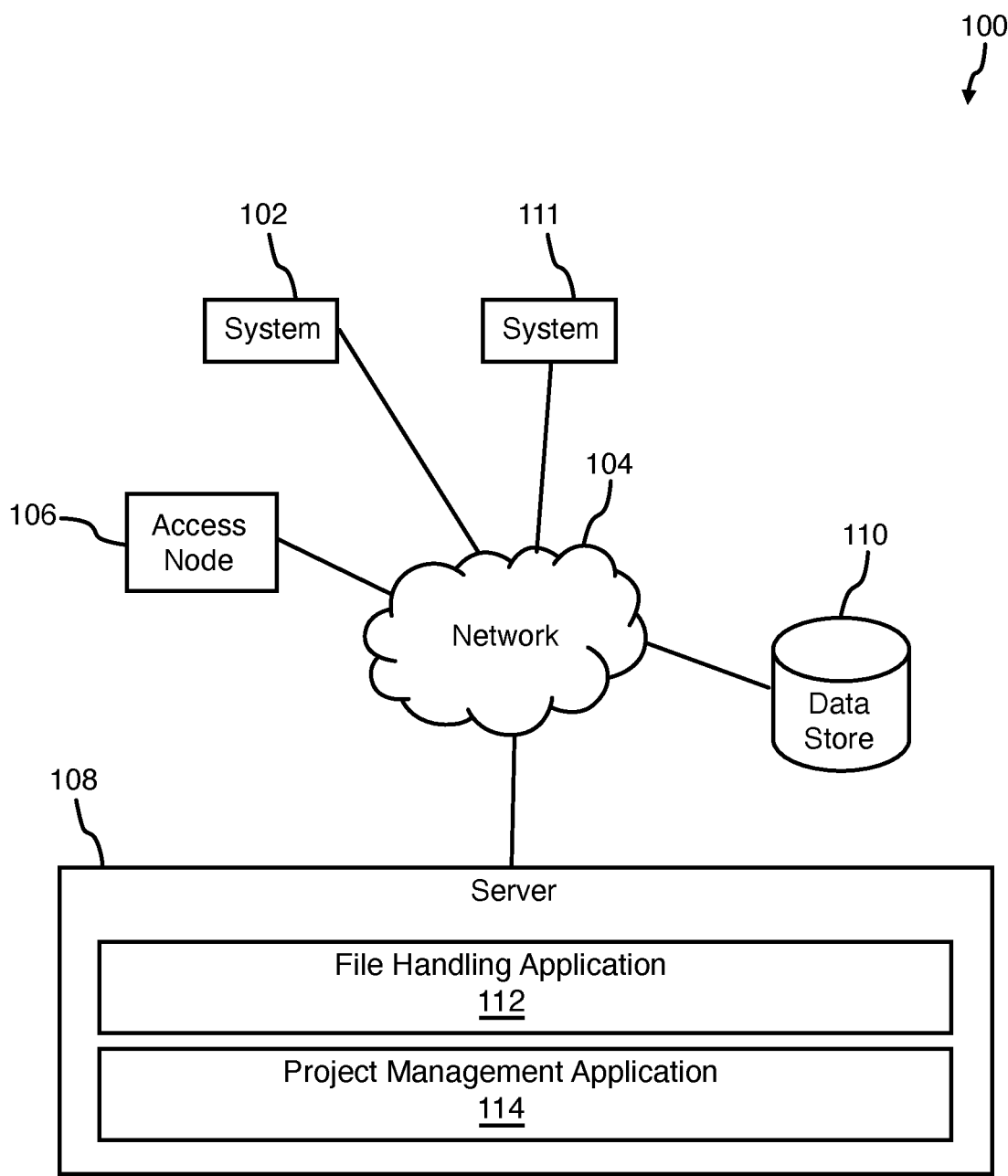
FIG. 1 is a block diagram of a system according to an example of the disclosure.

It should be understood at the outset that although illustrative implementations of one or more examples are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As described above, in certain circumstances, files may be transferred between parties to facilitate collaboration, shared responsibility, or the division of labor for an overall project or task. As file sizes increase, file quantities increase, or persons involved in the project increase, it can become cumbersome. For example, a first party may be responsible for creation of media content, such as images for printing, videos for display, images for display, documents for storage and later recall upon demand, or the like. The first party may provide a sample file to a second party for review and feedback or approval. Following the approval, the first party may attempt to provide a final file to the second party. In some examples, the final file may be larger, or much larger, in file size than the sample file.

Often, parties communicate with each other via electronic mail (email), such as resulting from the relative convenience and ubiquity of email. Many email providers impose limitations upon email communication, such as size limits which limit a file size of a file that may be attached and sent with the email. As used herein, a file size of a file that may be attached and sent with the email may be referred to as a communicable size and may be about 1 megabyte (MB), about 2 MB, about 3 MB, about 5 MB, about 10 MB, about 20 MB, about 25 MB, about 30 MB, about 50 MB, or any other suitable size which may increase as email and computing technology advances. For example, the final file described above may have a file size too large to allow the final file to be sent as an attachment to an email. To mitigate this challenge, applications have been developed that allow the upload of files to the application, and later recall of the files from the application by the uploader or another person. However, these applications add increased burden and challenges of their own. For example, the uploader of a file must have credentials for the application, which may involve a lengthy onboarding and permissions allocation process, which may be costly for an organization (e.g., the second party) managing the application. Further, the uploader may be required to accurately title, tag, route, etc., the uploaded file so that the uploaded file has correct permissions for other parties to have no access, edit access, view only access, download access, or the like to the uploaded file. Still further, the uploader may have to notify another individual, or cause the other individual to be notified, that the file has been uploaded and is now available for the other individual to access. Finally, as the file progresses through stages of a project, various users may have to log into the application to mark a particular stage of the project complete, provide other status updates, log events, or perform other actions. This complexity may increase a possibility for human error to introduce inaccuracies to the project record or handling of the file, or may prompt a user to skip certain steps, leading to an incomplete file history or audit trail for the file.

Examples of this disclosure provide for a file handling system for the automatic handling of data files. In an example, the file handling system includes multiple disparate applications, servers on which the applications execute, that may interact with one another. In some examples, the applications are at least partially under the control of a same entity. In other examples, at least some of the applications may be under the control of different entities. In an example, the applications impose a rules-based structure for the handling of files imported into the system. For example, the file handling system may route a file uploaded to the system to one or more locations based on a set of rules, generate notifications on a schedule or in response to trigger events and provide the notifications to entities based on the set of rules, grant access, or block access, to the file based on the rules, and the like. In some examples, the file handling system analyzes a filename of an uploaded file to determine rules for applying to the file. For example, responsive to the filename being, or including, a first string of characters, the file handling system applies a first set of rules to the file. Similarly, responsive to the filename being, or including, a second string of characters, the file handling system applies a second set of rules to the file. The first set of rules and the second set of rules may include at least some actions in common with one another and may include at least some actions that differ from one another. In some examples, a user uploads a file to the file handling system. In other examples, the file handling system monitors a folder of a third-party system or service for presence, uploading, saving, or the like of the file. For example, the file handling system may interact with a third-party file storage, cloud storage, archival, or other software or service provider via an application programming interface (API) provided by that third-party. Responsive to detecting that a file has been placed in a monitored folder on the third-party system, the file handling system may remove the file from the third-party system and store the file in a data store of the file handling system.

In some examples, the file handling system tags or otherwise marks the file based on an identity of an uploader of the file, or characteristics of a folder from which the file handling system obtains the file. Based on the tagging and the rules of the file handling system, access permissions for the file may be modified. In some examples, the file handling system renames the file before saving the file into the file handling system, while in other examples the file handling system leaves the name of the file unchanged. Further, based on the tagging and the rules of the file handling system, the file handling system may upload the file to another third-party system, such as via a secure file transfer protocol (SFTP) or other suitable file transfer protocol. In other examples, based on the tagging and the rules of the file handling system, the file handling system may send a notification to one or more persons indicating that the file is available for download from the file handling system. In some examples, the notification includes a download link for obtaining the file from the file handling system. The file handling system may also provide upload notifications. In some examples, the upload notifications may be on a per-file basis. In other examples, the upload notifications may be timed such that notifications are performed in a batch like manner. For example, the file handling system may send upload notifications on a periodic basis in which an upload notification for a party is for all uploads by the party that have been performed since an immediately preceding upload notification was sent to the party.

In some examples, the file handling system may also manipulate the file, make derivative copies of the file, or the like. For example, responsive to upload of the file, or obtaining of the file, the file handling system may create a scaled version of the file. In an example, the file may be a final file, or a print-ready file. A print-ready file may be a file that is ready for a production environment. For example, a print-ready file in the context of physical printing may have dimensions and/or a resolution suitable for printing. In the context of digital media, a print-ready (or production-ready, display-ready, or the like) file may have dimensions and/or a resolution suitable for display via a particular device or group of devices, such as movie theater projectors, large format screens, televisions, smartphones, billboards, or the like. As such, the print-ready file may be comparatively large in size and may be suitable for use in a more limited number of application environments than files having a smaller size. In some examples, the file handling system may create one or more copies of the file and scale the copies from a print-ready file size to other files sizes. For example, the file handling system may scale a first copy to have a largest x or y dimension in a cartesian coordinate system less than, greater than, or equal to a particular programmed value. The first copy may be, for example, suitable for use as a thumbnail preview. In some examples, the file handling system may create a second copy of the file having a resolution, dimensions, and/or file size that is less than a resolution of the print-ready file. The second copy may be, for example, suitable for use as a sample document, such as for printing via desktop printers, sharing via email, embedding in a presentation, or the like.

In some examples, the file handling system may interface with a project management system or another system. For example, to identify a project associated with the file, the file handling system may index into the project management system based on the string included in, or comprising, the filename of the file. Responsive to determining the project to which the file is associated, the file handling system may determine to which party or parties' notifications should be sent, to which party or parties the file should be sent, what derivative files, if any, should be created, permissions for access to the file, a naming convention (if any) for renaming the file, or any other suitable information. Responsive to performing actions related to the file, the file handling system may again interface with the project management system to increment a project tracker, indicate tasks of the project as being in progress, complete, incomplete, or any other suitable state based on a status of the file, or the like. In some examples, the file handling system interfaces with the project management system via one or more APIs. For example, responsive to receiving the file, the file handling system may interface with the project management system to mark a first task of the project as complete. Subsequently, the file handling system may provide the print-ready file to a third-party responsible for printing the print-ready file. Responsive to receiving a printer's proof for the file, the file handling system may interface with the project management system to assign a review task to an individual (such as an uploader, creator, or other assigned party based on the project) for reviewing the printer's proof. Responsive to receiving an approval of the printer's proof (or at any other suitable stage), the file handling system may interface with the project management system to mark the review task as complete. A project may have any number of associated tasks for which the file handling system may interface with the project management system to assign to an individual, mark as complete, or the like based on a status of one or more files (e.g., uploaded, party notified, downloaded, etc.).

In some circumstances, it may be useful to have a log or audit trail for a project, for a file, for actions performed by a particular user, for a particular monitored folder, or the like. In some examples, the file handling system may log each action taken by the file handling system with respect to a file, or may log actions selected from a predefined list that are taken by the file handling system with respect to a file. The log may include any suitable information that provides an audit trail, such as a date at which the file was received or an action was performed, a time, an associated user, an associated project, or the like. In some examples, the file handling system may form or maintain a separate log or logs of exception events, such as undeliverable notifications, failed uploads, or the like. In some examples, the file handling system may transmit a notification to an administrator of the file handling system, a supervisor of an organization that maintains the file handling system, or the like responsive to and indicating the occurrence of an exception event, or at an expiration of a predefined period of time and indicating multiple exception events that have occurred over the predefined period of time.

Turning now to FIG. 1, a system 100 in accordance with various examples is described. In an example, the system 100 includes an agency system 102, a network 104, an access node 106, a server 108, a data store 110, and a third-party system 111. In some examples, the server 108 includes multiple applications, including a file handling application 112 and a project management application 114. While the applications 112, 114 are shown as being executed by the server 108, in various examples any one or more of the applications 112, 114 may be executed by other servers (not shown), under control of the same or different parties, the scope of which is not limited herein. In an example, the network 104 provides communication connectivity to the agency system 102, the server 108, the data store 110, and the third-party system 111. For example, the network 104 may be one or more private networks, one or more public networks, or a combination thereof. The network 104 may comprise a public switched telephone network (PSTN). The network 104 may comprise the Internet.

In some examples, the agency system 102 communicates with the network 104, and by extension the server 108 and/or data store 110 through wired communication. In other examples, the agency system 102 communicates with the network 104, the server 108, and/or data store 110 via the access node 106. The access nodes 106 may be said to establish an access network. The access network may be referred to as a radio access network (RAN) in some contexts. In a 5G technology generation an access node 106 may be referred to as a next Generation Node B (gNB). In 4G technology (e.g., long-term evolution (LTE) technology) an access node 106 may be referred to as an evolved Node B (eNB). In 3G technology (e.g., code division multiple access (CDMA) and global system for mobile communication (GSM)) an access node 106 may be referred to as a base transceiver station (BTS) combined with a base station controller (BSC). In some contexts, the access node 106 may be referred to as a cell site or a cell tower. In some implementations, a picocell may provide some of the functionality of an access node 106, albeit with a constrained coverage area. Each of these different examples of an access node 106 may be considered to provide roughly similar functions in the different technology generations.

In an example, the agency system 102 may be under control of a party other than a party who controls the server 108. For example, the agency system 102 may be under control of an agency, organization, or other entity who is a vendor of the party who controls the server 108. Similarly, the third-party system 111 may be under control of another party other than the party who controls the server 108. For example, the third-party system 111 may be under control of another vendor of the party who controls the server 108. A user may use the agency system 102 to provide a media asset to the file handling application 112. In some examples, the media asset may be for printing or other use by the party who controls the third-party system 111. In an example, the user may, via the agency system 102, log into or otherwise access an interface of the file handling application 112 and upload the media asset to the file handling application 112. In another example, the user may place the media asset into a file folder or other directory of the agency system 102, or a data store (not shown) coupled to the agency system 102. The file handling application 112 may monitor the file folder for the presence of a file. Responsive to detecting the presence of the file, the file handling application 112 may remove the file from the folder and store the file in a location accessible to the server 108, such as the server 108 itself, or the data store 110.

Responsive to receiving the file, whether from upload by the user or by retrieving the file from a monitored folder, the file handling application 112 may identify the file. In some examples, the file handling application 112 identifies the file based on a filename of the file. For example, the file handling application 112 may analyze a filename of the file to determine rules for applying to the file. Responsive to the filename being, or including, a first string of characters, the file handling application 112 may apply a first set of rules to the file. Similarly, responsive to the filename being, or including, a second string of characters, the file handling application 112 may apply a second set of rules to the file. The first set of rules and the second set of rules may include at least some actions in common with one another and may include at least some actions that differ from one another.

Based on the filename and/or the rules, the file handling application 112 may perform one or more actions. For example, the file handling application 112 may rename the file, the file handling application 112 may modify permissions such as access, edit, or other permissions associated with the file for at least some users, the file handling application 112 may update a record associated with the file, such as a record of a project maintained by the project management application 114 and to which the file belongs, the file handling application 112 may generate and send one or more notifications to one or more users, the file handling application 112 may upload the file to another system, such as the third-party system 111, the file handling application 112 may generate derivative files from the file, the file handling application 112 may manipulate or alter content of the file, or the like. In some examples, based on the rules, the file handling application 112 may set one or more flags, tags, or other indicators associated with the file. For example, the file handling application 112 may tag the file based on a security classification of the file, tag the file as being for internal or external use, or the like.

In an example, the file handling application 112 performs validation and/or verification of the file. For example, the file handling application 112 may confirm that the file has been obtained in its entirety (either fully uploaded or fully copied) prior to performing other processing on, or related to, the file. In another example, the file handling application 112 may determine whether a file type of the file is an allowed file type. In some examples, this determination is made based on one or more rules applied to a folder to which the file is uploaded by the user, or a monitored folder in which the file is placed by the user. In another example, the determination of an allowed file type is made by the file handling application 112 examining a binary of the file. Responsive to the file passing the validation (e.g., the file has been fully obtained, the file has an allowed file type, etc.), the file handling application 112 performs further processing of the file, as described herein. Responsive to the file not passing (e.g., failing) the validation, the file handling application 112 may delete a file and provide one or more notifications. The notifications may indicate that the file has been deleted, a reason for the deletion, a cause of the file failing the validation, or the like. The notifications may be sent to any suitable parties, such as a user who provided the file, a system administrator, or the like.

In some examples, responsive to receipt of the file, the file handling application 112 generates and transmits a notification. For example, the file handling application 112 may generate a notification indicating that the file handling application 112 has received the file. The file handling application 112 may generate and send the notification on a per file basis, or on a batch basis. For example, uploaded files and notifications may have a one to one correspondence, or a multiple to one correspondence. In some examples, such as to reduce a number of notifications being generated or transmitted, the file handling application 112 may cache or delay upload indications for a programmed amount of time. For example, the file handling application 112 may transmit a notification to a user, or to an organization to which the user and other users who upload files belong, on a periodic basis if any new files have been uploaded during the preceding period since a last notification was transmitted. The period may be 5 minutes, 10 minutes, 15 minutes, 30 minutes, 1 hour, 2 hours, 6 hours, 24 hours, or any other suitable time frame. In some examples, reducing the frequency with which the notifications are transmitted may reduce clutter or email volume in an email inbox of the user, thereby reducing network bandwidth occupied associated with sending of the notifications and memory space consumed by the notifications on a device of the user.

In some examples, different users may receive notifications at different time intervals for a same file. For example, the user who provided the file, or an organization to which that user belongs, may receive a periodic notification that includes a listing of all files uploaded by that user or that organization, respectively, since an immediately preceding notification. Another user may also receive a notification for the file. For example, another user may receive a notification that the file was uploaded on a one to one basis, may receive a notification at a different periodicity (e.g., all files uploaded over the past day, week, etc.) for a particular user or organization, or irrespective of from which user or organization the files originated, or the like.

In some examples, the file is designated for use by, or delivery to, a third-party. For example, the file may be a print asset designated for printing by the third-party. In other examples, the file may be for internal use by a particular division of the party who controls the server 108. For example, the file may be a digital asset for display in a retail environment. In such an example, the division for which the file is designated for use may be considered the third-party by the file handling application 112. In an example, the file handling application 112 may identify the third-party based on rules, as described above. For example, based on the filename of the file, the file handling application 112 may determine a rule to apply to the file. Based on the rule, the file handling application 112 identifies to which third-party (s) the file should be provided.

Responsive to the identification, the file handling application 112 may provide the file to the third-party(s). In some examples, the file handling application 112 provides the file to the third-party(s) by providing a notification of availability of the file to the third party(s), where the notification includes a link to download the file from an Internet-accessible or networked storage device (e.g., such as the data store 110). In some examples, the link may be protected, such as only being functional for a programmed amount of time, only functional for a programmed number of downloads, only functional for devices having a certain identity (e.g., a certain media access control (MAC) address, a certain Internet Protocol (IP) address, etc.), or requiring the input of a password or other credentials. In other examples, the file handling application 112 provides the file to the third-party(s) by providing a notification including the file to the third party(s). In other examples, the file handling application 112 provides the file to the third-party(s) by uploading the file to a system of the third-party(s), such as via a file transfer protocol, SFTP, or the like. In some example, the file handling application 112 may also provide a notification to the third-party(s) responsive to uploading the file to a system of the third-party(s).

In some examples, the file handling application 112 may subsequently receive a second file from the third-party(s). For example, for a print asset, the third-party may be a print agency. The print agency may prepare a printer's proof based on the file and provide that file to the file handling application 112 as the second file. The second file may be provided in any suitable manner, including upload or placing in a monitored folder, as described above. In an example, the second file has a filename associated with the filename of the file and indicating that the second file is a printer's proof. Based on the rules described above, the file handling application 112 may determine a user or organization to which the second file should be provided. For example, the file handling application 112 may determine that the second file should be provided to the user who provided the file, or to an internal user, for comparison of the second file to the file, or to a derivative of the file (such as an agency proof). Responsive to the determination, the file handling application 112 may provide the second file to the determined party.

At various stages of the file handling process, the file handling application 112 may interact with the project management application 114 to update a project status. For example, the file handling application 112 may interact with the project management application 114 to update a status indicating which user or party currently has an active task to perform for the project, to cause the project management application 114 to transmit a notification, or the like. In some examples, the file handling application 112 may interact with the project management application 114 to update the status of the project each time the file handling application 112 receives or provides a file associated with a project. In an example, responsive to the determined party (e.g., the user, or agency of the user, who provided the file) reviewing the second file, the determined party may indicate approval or rejection of the second file in the project management application 114. Responsive to receipt of the indication, the project management application 114 may transmit a notification to the third-party that provided the second file, indicating the approval or rejection.

In some examples, the file handling application 112 may manipulate the file, copy the file, make one or more derivative files, or the like. In some examples, the file may be comparatively large in size, as described above, resulting from its suitability for printing, suitability for high resolution display, or the like. As a result, the file handling application 112 may receive the file and, based on the rules, create one or more derivative files. In an example, the file handling application 112 may create a derivative file having a reduced resolution compared to the file, reduced dimensions compared to the file, or otherwise reduced in file size compared to the file. In another example, the file handling application 112 may create a derivative file that is a preview or thumbnail representation of the file. To create the preview or thumbnail representation, the file handling application

112 may crop or otherwise alter an aspect ratio of the file to create the derivative file. In various examples, the file handling application 112 may create multiple derivative files based on the file, where each of the derivative files has unique characteristics. For example, the file handling application 112 may create various derivative files suitable for transmission by email, viewing on a display screen, printing on a desktop printer, embedded in a presentation, display on a mobile device, use as a thumbnail or preview, or the like. In other examples, rather than the file handling application 112 creating the derivative file(s), the user, or another user of the organization to which the user belongs, may generate and provide (by uploading or placing in a monitored folder, as described above) at least some of the derivative files.

In some examples, the file handling application 112 may restrict access to the file. For example, access to the file may be restricted to users of one or more particular organizations. In another example, access to the file may be restricted to a timed duration, such that the file handling application 112 may delete or otherwise make the file inaccessible following an expiration of a programmed duration of time. In yet another example, the access to the file may be restricted by volume, such that the file handling application 112 may delete or otherwise make the file inaccessible following a programmed number of access attempts, downloads, or the like, of the file.

In some examples, the file handling application 112 creates a log or audit history. The log may be in the form of a database, a hyperledger or other immutable data structure, or any other suitable data storage form. The log may include a history of actions performed by, or related to, the file handling application 112 with data related to the actions. For example, the log may include an identity of the user who provided the file, a date and/or time stamp at which the file was provided, an original filename of the file, a file extension or file type of the file, a size of the file, a calculated checksum of the file, an identifier associated with the file, such as a stock keeping unit (SKU) or other number, a path or location for accessing the file, a listing of derivative files which were created from the file, a listing of users to which the file was provided and data and/or time stamps corresponding to that provision, an access history indicating which users accessed the file and at what dates/times, a notification history indicating to which users and at what dates/times notifications were sent regarding the file, a project name or number to which the file is associated (such as a project managed or maintained by the project management application 114), or any other suitable data related to handling of the file by the file handling application 112 and/or the project management application 114.

Figure 2:
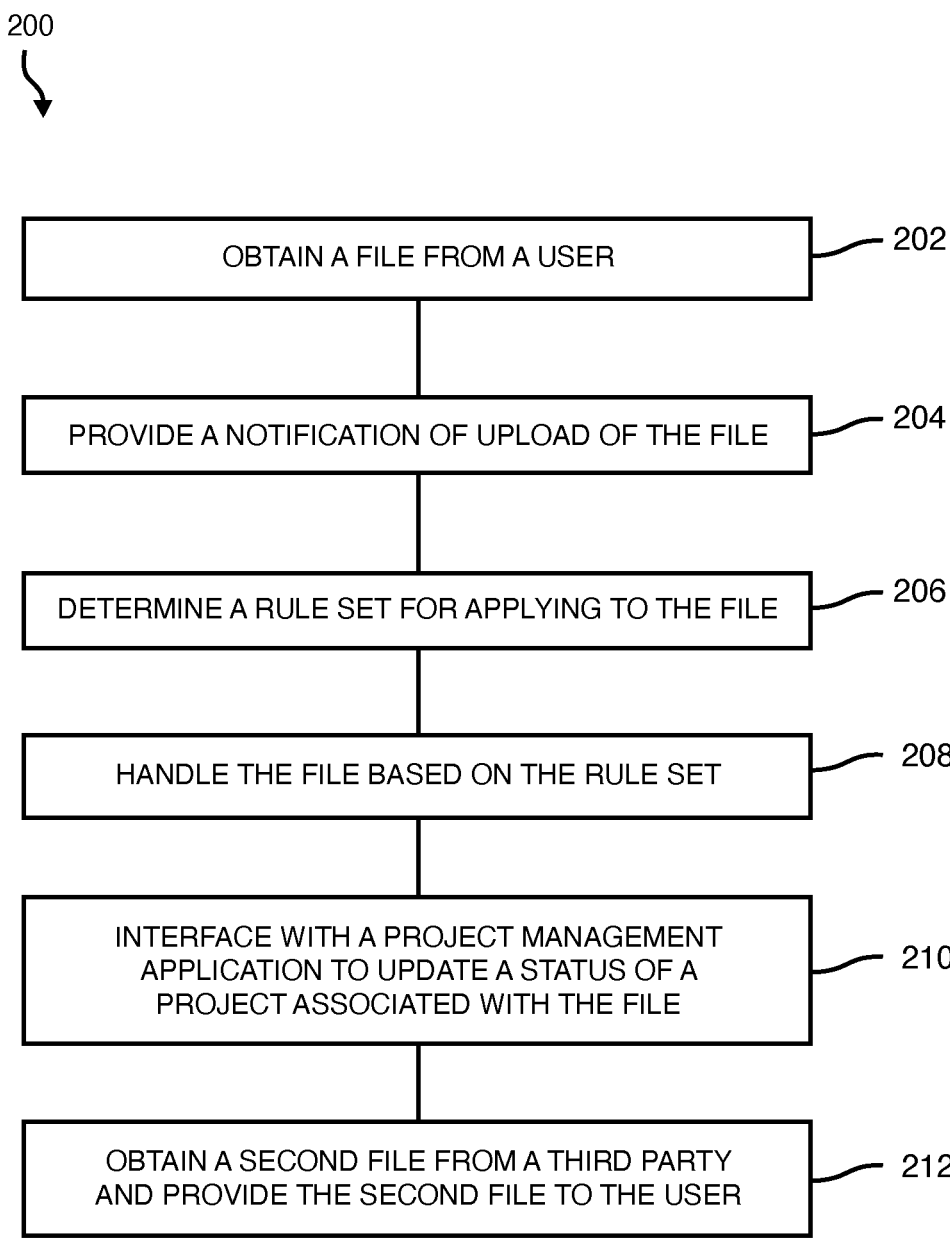
FIG. 2 is a flowchart of a method for automated file handling according to an example of the disclosure.

FIG. 2 is a flowchart of a method 200 for automated file handling, in accordance with various examples. In some examples, the method 200 is implemented to at least partially automate the handling of files, such as according to a rule set. The method 200 may be a computer-implemented method, such as implemented by a server or other computing device. In an example, the method 200 is implemented as a series of computer-executable instructions which may be stored in a non-transitory storage medium and be executed by a processor or processors. Responsive to execution, the instructions may cause the processor(s) and/or other components of the computing device to be configured or programmed in a particular state, or control the processor(s) or other components to perform one or more actions. In some examples, the method 200 is performed at least in part by the server 108, such as via the file handling application 112, as described above herein.

At operation 202, the file handling application 112 obtains a file. In some examples, the file handling application 112 obtains the file via a user uploading the file to the server 108, the data store 110, the file handling application 112, or the like. In other examples, the file handling application 112 monitors a folder of a third-party system or service for presence, uploading, saving, or the like of the file. For example, the file handling application 112 may interact with a third-party file storage, cloud storage, archival, or other software or service provider via an API provided by that third-party. Responsive to detecting that the file has been placed in the monitored folder, the file handling application 112 may remove the file from the third-party system and store the file in a data store accessible to the file handling application 112, such as the data store 110.

In some examples, the file handling application 112 performs validation or other verification of the file. For example, the file handling application 112 may determine whether the file has an acceptable file type. Responsive to determining that the file has an acceptable file type, the method 200 proceeds to operation 202. Responsive to determining that the file does not have an acceptable file type, the file handling application 112 may delete the file. In some examples, responsive to deleting the file, the file handling application 112 may transmit a notification to the user who provided the file, such as indicating that the file did not have an acceptable file type and was deleted, indicating an acceptable file type for the file, or the like. In some examples, the file handling application 112 logs the obtaining of the file in a log or other record, such as for use in auditing the system 108 and/or the handling of the file.

At operation 204, the file handling application 112 provides a notification of upload of the file. In some examples, the file handling application 112 provides multiple notifications of upload of the file. For example, responsive to obtaining and validating the file, the file handling application 112 may transmit a notification of upload of the file. In other examples, responsive to passage of a programmed amount of time, the file handling application 112 may transmit a notification of all files uploaded during the programmed amount of time, all files uploaded by a particular user during the programmed amount of time, all files uploaded by users belonging to a same organization during the programmed time, or the like. In some examples, notifications are provided to any one or more of the user who provided the file, an organization or agency to which the user who provided the file belongs, a system administrator, or the like. In various examples, different users may receive notifications for different programmed time ranges. In some examples, the file handling application 112 logs the providing of the notification(s) in a log or other record, such as for use in auditing the system 108 and/or the handling of the file.

At operation 206, the file handling application 112 determines a rule set for applying to the file. In some examples, the rule set is determined based on a filename or other indicator of the file. For example, the filename may correspond to a SKU or other unique indicator of the file.

At operation 208, the file handling application 112 handles the file based on the rule set. In some examples, handling the file includes the file handling application 112 generating one or more derivative files based on the file, such as described above herein. In other examples, handling the file includes the file handling application 112 providing the file to a third party. In various examples, providing the file to the third party includes transmitting a notification to the third party indicating that the file is available for downloading from the system. In some examples, the notification includes a link for accessing the file. The file may be secured such that the file may be downloaded only for a programmed amount of time, only until a programmed number of downloads have been performed, only by certain authorized users, only by users having certain allowed network addresses, or the like. In other examples, providing the file to the third party includes uploading the file to a system of the third party, such as via a SFTP or any other suitable file transfer protocol. In some examples, the file handling application 112 may transmit a notification to the third party indicating that the file has been uploaded to the system of the third party. In some examples, the file handling application 112 logs the providing of the file to the third party in a log or other record, such as for use in auditing the system 108 and/or the handling of the file.

In some examples, the third party may be an internal division within a same organization that also manages the file handling application 112. For example, in a first implementation, the third party is a printer tasked with printing and distributing the file to the organization. In a second implementation, the third party may be a division within the organization tasked with printing the file themselves, rather than receiving a printed version of the file from another entity. In a third implementation, the third party may be a division within the organization tasked with displaying the file, such as in a digital environment. In a fourth implementation, the third party may be an individual within, or external to, the organization who may find the file useful for any suitable process and who is authorized to receive the file.

At operation 210, the file handling application 112 interfaces with a project management application 114 to update a status of a project associated with the file. For example, the file handling application 112 may interface and interact with the project management application 114 via an API provided by the project management application 114. The file handling application 112 may interact with the project management application 114 to update a status of the project responsive to the file handling application 112 performing an action related to the file, update a target user for performing an action related to the project, or the like. In some examples, the file handling application 112 logs actions performed via interaction with the project management application 114 in a log or other record, such as for use in auditing the system 108 and/or the handling of the file.

The file handling application 112 may interface and interact with the project management application 114 automatically responsive to actions performed by the file handling application 112 without further intervention by a user. For example, responsive to the file handling application 112 obtaining the file, the file handling application 112 may automatically interface and interact with the project management application 114 to update a status of a project associated with the file without user intervention. Similarly, responsive to the file handling application 112 determining to provide the file to the third party based on the rule set and providing the file to the third party, the file handling application 112 may automatically interface and interact with the project management application 114 to update a status of a project associated with the file without user intervention.

At operation 212, the file handling application 112 obtains a second file from the third party. In various examples, the second file is obtained according to any suitable process, such as upload by the third party or the second file being placed in a monitored folder, as described above herein. Responsive to obtaining the second file, the file handling application 112 may interface with the project management application 114 to determine a target for the second file. For example, the second file may be a proof for review and approval. In some examples, the file handling application 112 provides the second file to the project management application 114 for association with a task that is assigned to a particular user. In other examples, the file handling application 112 determines a target user for the second file based on the interaction with the project management application 114 and provides a notification to that target user indicating availability of the second file. In some examples, the notification includes a link to access the second file. In some examples, the file handling application 112, or the project management application 114, may provide a notification to the third-party indicating approval or rejection of the second file, such as in examples in which the second file is a proof for approval prior to printing of the file by the third party. In some examples, the file handling application 112 logs the obtaining and handling of the second file in a log or other record, such as for use in auditing the system 108 and/or the handling of the second file.

Figure 3:
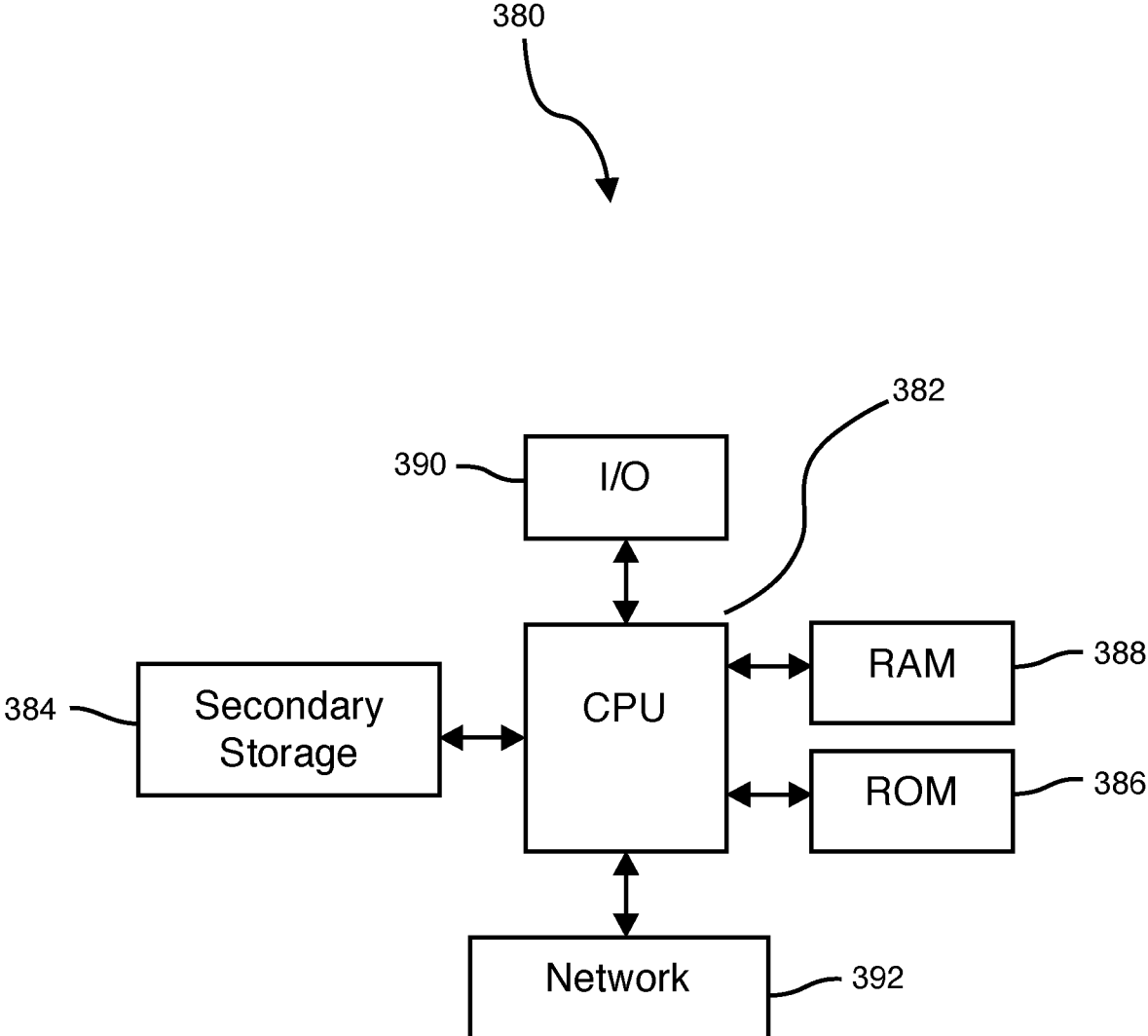
FIG. 3 is a block diagram of a computer system according to an example of the disclosure.

FIG. 3 illustrates a computer system 380 suitable for implementing one or more examples disclosed herein. The computer system 380 includes a CPU 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The CPU 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the computer system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an example, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the CPU 382 to communicate with the Internet or one or more intranets.

With such a network connection, it is contemplated that the CPU 382 might receive information from the network, or might output information to the network in the course of performing the above-described method steps. Such information, which is often represented as a sequence of instructions to be executed using CPU 382, may be received from and outputted to the network, for example, in the form of a computer data signal embodied in a carrier wave.

Such information, which may include data or instructions to be executed using CPU 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The CPU 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one CPU 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an example, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an example, virtualization software may be employed by the computer system 380 to provide the functionality of a number of servers that is not directly bound to the number of computers in the computer system 380. For example, virtualization software may provide twenty virtual servers on four physical computers. In an example, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an example, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The CPU 382 may process the executable instructions and/or data structures in part by directly accessing the computer program product, for example by reading from a CD-ROM disk inserted into a disk drive peripheral of the computer system 380. Alternatively, the CPU 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM example of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the CPU 382 may comprise an internal RAM, an internal ROM, a cache memory, and/or other internal non-transitory storage blocks, sections, or components that may be referred to in some contexts as non-transitory computer readable media or computer readable storage media.

While several examples have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various examples as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of performing automatic project management across multiple systems including automated project milestone tracking and automated tagging, routing, notification, and logging of files for print production, the method comprising:

monitoring, automatically by a file handling application, a folder of a data store;

determining, automatically by the file handling application, that a file has been stored in the folder by a first user, wherein the file is a print-ready file for printing and has a file size greater than a communicable size;

responsive to determining that the file has been stored in the folder, automatically moving, by the file handling application, the file from the folder to a second data store having restricted access permissions;

automatically determining by the file handling application, responsive to obtaining the file and based on a file name of the file and a file type of the file, a rule set to apply to the file, wherein the rule set indicates actions to perform with respect to the file including routing the file between multiple systems automatically and without human intervention;

providing, automatically by the file handling application and based on the rule set, the file to a second user, wherein the second user is a vendor tasked with printing the file;

receiving, from the second user, a second file, wherein the second file is a printer proof of the file prepared by the second user;

automatically determining by the file handling application, responsive to obtaining the second file, a rule set to apply to the second file;

providing, automatically by the file handling application and based on the rule set, the second file to the first user for approval or rejection of the printer proof by the first user; and interacting, automatically and without human intervention, with a project management system to, in real-time, update project milestones of a project associated with the file based on obtaining the file, routing the file, obtaining the second file, and providing the second file.

2. The method of claim 1, wherein the file name includes a stock keeping unit (SKU) of the project associated with the file.

3. The method of claim 1, wherein automatically providing the file includes:

determining, automatically by the file handling application and based on the rule set, the second user as a target for the file;

generating, automatically by the file handling application and based on the rule set, a notification including a link for accessing the file in the second data store; and transmitting, automatically by the file handling application, the notification to the second user.

4. The method of claim 1, wherein automatically providing the file includes:

determining, automatically by the file handling application and based on the rule set, a third data store associated with the second user; and uploading the file to the third data store.

5. The method of claim 1, further comprising automatically logging, in a searchable database by the file handling application, each action taken by the file handling application with respect to the file to create an audit history for the file.

6. The method of claim 1, further comprising periodically transmitting an upload notification to the first user, wherein the upload notification includes a listing of one or more files, including the file, obtained by the file handling application from the first user since an immediately preceding notification was transmitted to the first user.

7. A method of performing automatic project management across multiple systems including automated project milestone tracking, automated tagging, routing, notification of file, and logging of files, and automated generation of an audit history, the method comprising:

obtaining, by a file handling application, a file;

automatically providing, by the file handling application, a notification of the upload of the file;

automatically determining, by the file handling application, a rule set for applying to the file;

handling, automatically by the file handling application and without human intervention, the file based on the rule set;

interfacing, by the file handling application, with a project management application to automatically update a status of a project associated with the file based on actions taken by the file handling application; and responsive to each interaction by the file handling application with the file, automatically logging, in a searchable database by the file handling application, each action taken by the file handling application with respect to the file to create an audit history for the file.

8. The method of claim 7, wherein obtaining the file includes:

monitoring, automatically by the file handling application, a folder of a data store;

determining, automatically by the file handling application, that the file has been stored in the folder; and responsive to determining that the file has been stored in the folder, automatically moving, by the file handling application, the file from the folder to a second data store.

9. The method of claim 7, wherein automatically determining the rule set for applying to the file includes:

indexing, automatically by the file handling application, into a rule set database based on a filename of the file; and determining, automatically by the file handling application, a rule set to apply to the file based on the filename.

10. The method of claim 9, wherein handling the file based on the rule set includes:

determining, based on the rule set, a user as a target for the file;

generating a notification including a link for accessing the file; and transmitting the notification to the user.

11. The method of claim 9, wherein handling the file based on the rule set includes:

determining, based on the rule set, a derivative file for generation based on the file; and generating, from the file, the derivative file.

12. The method of claim 7, wherein the file handling application interfaces with the project management application via an application programming interface of the project management application.

13. A system for automatic project management across multiple systems including automated project milestone tracking, automated tagging, routing, notification of file, and logging of files, and automated generation of an audit history, comprising:

a data store;

a server executing a file management application configured to:

obtain a file;

responsive to obtaining the file, automatically determine a rule set to apply to the file, wherein the rule set indicates actions for the server to perform with respect to the file including routing the file between multiple systems automatically and without human intervention;

based on the rule set, automatically provide the file to a user; and responsive to each interaction by the file management application with the file, automatically logging, in a searchable database by the file management application, each action taken by the file management application with respect to the file to create an audit history for the file.

14. The system of claim 13, wherein obtaining the file includes:

monitoring a folder of a second data store;

determining that the file has been stored in the folder; and responsive to determining that the file has been stored in the folder, automatically moving the file from the folder to the data store.

15. The system of claim 13, wherein obtaining the file includes:

receiving the file as an upload document from a second user; and storing the file in the data store.

16. The system of claim 13, wherein automatically providing the file includes:

determining, based on the rule set, the user as a target for the file;

generating a notification including a link for accessing the file in the data store; and transmitting the notification to the user.

17. The system of claim 13, wherein automatically providing the file includes:

determining, based on the rule set, a second system associated with the user;

accessing the second system associated with the user; and uploading the file to the second system.

18. The system of claim 13, wherein the server is configured to periodically transmit an upload notification to a party from which the file was obtained, and wherein the upload notification includes a listing of one or more files, including the file, obtained by the system from the party since an immediately preceding notification transmitted to the party.

19. The system of claim 18, wherein the server is configured to:

receive a second file from the user;

determine, based on the rule set, to provide the second file to the party from which the file was obtained; and provide the second file to the party from which the file was obtained.

20. The system of claim 13, wherein the server is configured to control a project management application to automatically update a status of a project associated with the file based on actions taken involving the file.

* * * * *